US010007023B2

(12) United States Patent
Larimore et al.

(10) Patent No.: US 10,007,023 B2
(45) Date of Patent: Jun. 26, 2018

(54) DOWNHOLE SWITCHING OF WELLBORE LOGGING TOOLS

(71) Applicant: Halliburton Energy Services, Inc., Houston, TX (US)

(72) Inventors: David R. Larimore, Dallas, TX (US); Thomas Owen Roane, Alvord, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days. days.

(21) Appl. No.: 15/565,936

(22) PCT Filed: May 14, 2015

(86) PCT No.: PCT/US2015/030801
§ 371 (c)(1),
(2) Date: Oct. 12, 2017

(87) PCT Pub. No.: WO2016/182575
PCT Pub. Date: Nov. 17, 2016

(65) Prior Publication Data
US 2018/0106927 A1    Apr. 19, 2018

(51) Int. Cl.
*E21B 43/04* (2006.01)
*G01V 5/10* (2006.01)
*E21B 47/00* (2012.01)
*G01V 5/04* (2006.01)

(52) U.S. Cl.
CPC .............. *G01V 5/10* (2013.01); *E21B 43/04* (2013.01); *E21B 47/00* (2013.01); *G01V 5/045* (2013.01)

(58) Field of Classification Search
CPC ....... E21B 43/045; E21B 43/088; E21B 43/08

USPC ......................................................... 166/278
See application file for complete search history.

(56) References Cited

U.S. PATENT DOCUMENTS

| 4,783,995 A * | 11/1988 | Michel .................... E21B 43/04 |
| | | 166/250.17 |
| 5,329,998 A | 7/1994 | King et al. |
| 6,119,777 A | 9/2000 | Runia |
| 6,341,654 B1 | 1/2002 | Wilson et al. |
| 6,554,065 B2 | 4/2003 | Fisher et al. |

(Continued)

OTHER PUBLICATIONS

International Search Report and Written Opinion received for PCT Patent Application No. PCT/US2015/030801, dated Jan. 28, 2016; 10 pages.

*Primary Examiner* — Kenneth J Malkowski
(74) *Attorney, Agent, or Firm* — Baker Botts L.L.P.

(57) ABSTRACT

A system and method for downhole switching of wellbore logging tools is disclosed. The method includes lowering a logging tool in a wellbore tubular, and actuating a mechanical interference device based on interaction with a first mechanical intrusion associated with a screen assembly located downhole in a wellbore. The mechanical interference device is included in an activator module associated with the logging tool. Based on actuating the mechanical interference device, the method includes communicating a first trigger indication to a switching system included with the activator module. In response to the first trigger indication, the method further includes switching the logging tool between an inactive state and an active state. In the active state, an electrical load associated with the logging tool is energized by a power supply.

20 Claims, 2 Drawing Sheets

(56) References Cited

U.S. PATENT DOCUMENTS

| | | | |
|---|---|---|---|
| 6,766,862 B2 | 7/2004 | Chatterji et al. | |
| 7,093,674 B2 | 8/2006 | Paluch et al. | |
| 7,322,416 B2 | 1/2008 | Bruiss, II et al. | |
| 7,735,555 B2 | 6/2010 | Patel et al. | |
| 8,215,406 B2 | 7/2012 | Dale et al. | |
| 8,240,382 B2 | 8/2012 | Krush | |
| 8,496,055 B2 | 7/2013 | Mootoo et al. | |
| 2002/0033281 A1* | 3/2002 | Aumann | E21B 25/08 175/244 |
| 2006/0102347 A1 | 5/2006 | Smith | |
| 2010/0017134 A1 | 1/2010 | Steinman et al. | |
| 2011/0073308 A1 | 3/2011 | Assal et al. | |
| 2011/0248566 A1* | 10/2011 | Purkis | E21B 33/0355 307/40 |
| 2012/0043079 A1 | 2/2012 | Wassouf et al. | |
| 2013/0180709 A1 | 7/2013 | Ritter et al. | |
| 2013/0233574 A1* | 9/2013 | Themig | E21B 23/06 166/387 |

\* cited by examiner

DOWNHOLE SWITCHING OF WELLBORE LOGGING TOOLS

RELATED APPLICATIONS

This application is a U.S. National Stage Application of International Application No. PCT/US2015/030801 filed May 14, 2015, which designates the United States, and which is incorporated herein by reference in its entirety.

TECHNICAL FIELD OF THE INVENTION

The present disclosure relates generally to downhole logging and, in particular, to downhole switching of wellbore logging tools.

BACKGROUND

Logging tools are used to log various hydrocarbon well measurements during drilling of the well, during completion of the well, and during production of hydrocarbons by the well. Measurements often relate to wellbore conditions and characteristics of the formation surrounding the wellbore. A wide array of logging tools are used to obtain these measurements. Logging tools include a variety of sensors, actuators, telemetry devices, and other suitable measuring devices for the particular application. Logging tools may evaluate the effectiveness of a gravel pack including determining the location and presence of any voids.

BRIEF DESCRIPTION OF THE DRAWINGS

To provide a more complete understanding of the present disclosure and the features and advantages thereof, reference is made to the following description, taken in conjunction with the accompanying drawings, in which.

DETAILED DESCRIPTION

The present disclosure relates to downhole switching of wellbore logging tools. In particular, it relates to switching a logging tool from an active to an inactive state while the logging tool remains in the wellbore. A mechanical interaction system, a magnetic coupling system, a radio frequency identification (RFID) system, and/or any other triggering mechanism that consumes minimal or no electrical power switches the logging tool between the inactive state and the active state. Power is conserved by switching the logging tool to an inactive state when measurements are not needed or the logging tool does not otherwise need to be active. Power conservation accomplished by the systems of this disclosure allow a logging tool to remain in the wellbore during the entire completion and evaluation of the gravel pack. Systems of the present disclosure switch the logging tool to an inactive state after the tool is initially lowered past the gravel pack area, and switch the logging tool to an active state based on the logging tool being raised proximate to the gravel pack area.

The logging tool may be switched between active and inactive states at different locations in the wellbore and during different phases of the logging operation. For instance, the logging tool may be active during its initial trip through the wellbore and proximate to any gravel pack area, in order to obtain background or baseline measurements. Once past the gravel pack, the logging tool may be switched to an inactive state, Then the logging tool is switched back to an active state as it is raised and nears the gravel pack area again, allowing comparative measurements to be made. A gravel pack is placed at strategic locations in a wellbore to inhibit particulate flow. Evaluation of the effectiveness of a gravel pack is based in part on the determination of the presence and location of voids soon after completion. Voids in the gravel pack are detected using data associated with density logs, neutron logs, gamma logs, and/or pulsed neutron logs. Installing a gravel pack may take a significant amount of time, for example, approximately eighty hours. As such, maintaining the logging tool in an inactive state while downhole conserves energy and enables the taking of measurements of the gravel pack when the tool is raised.

When a mechanical interaction system switches the logging tool between active and inactive states, a mechanical interference device cooperates or interacts with one or more mechanical intrusions to generate a trigger indication for a switching system. When a magnetic coupling system switches the logging tool between active and inactive states, a magnetic sensor cooperates with one or more magnetic devices to generate a trigger indication for a switching system. The switching system is configured to either allow or disallow a power supply to supply power to an electrical load.

Figure 1:
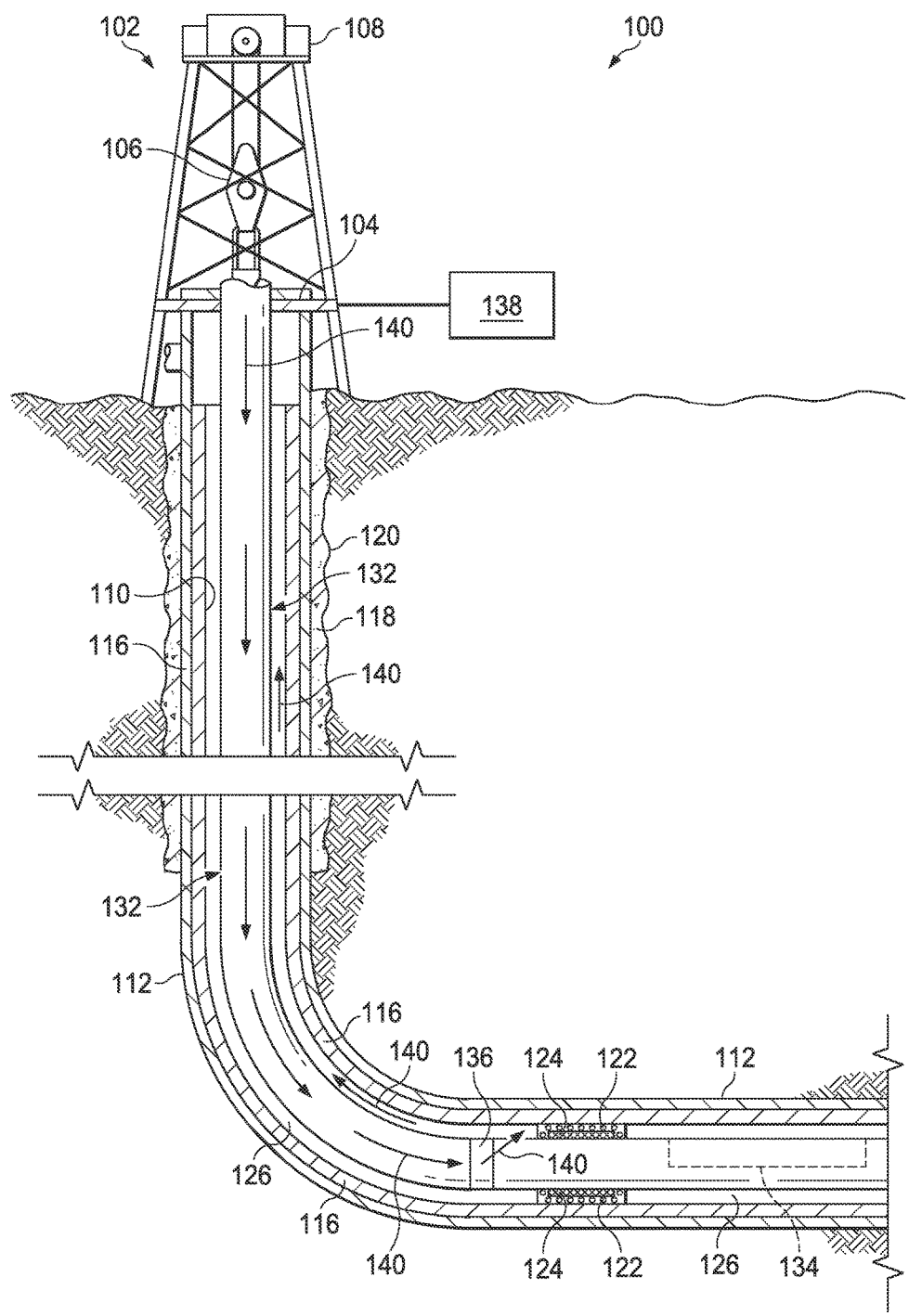
FIG. 1 is an elevation view of an example production system during a gravel pack operation.

A logging tool of the present disclosure may be used in a production operation, such as production operation 100 in FIG. 1. FIG. 1 is an elevation view of an example production system 100 during a gravel pack operation. Production system 100 is configured to extract hydrocarbons from one or more geological formations. Production system 100 includes a well surface or well site 102. Various types of extraction equipment are located at well site 102. For example, well site 102 includes platform 104, hoisting apparatus 106, and derrick 108. Although shown as a land production operation, logging tools incorporating teachings of the present disclosure may be satisfactorily used with production operations located on offshore platforms, drill ships, semi-submersibles and drilling barges (not expressly shown).

Production system 100 includes production tubing 110 associated with a wide variety of wellbores or bore holes, such as wellbore 112, that may include portions that are generally vertical and generally horizontal as shown in FIG. 1. Although logging tool 134 shown in FIG. 1 is associated with a generally horizontal wellbore section, the logging tool of the present disclosure is equally well-suited for use in wells having other directional orientations such as deviated wells, inclined wells or vertical wells. Wellbore 112 is defined in part by wellbore tubular 116 that extends from well site 102 to a selected downhole location.

In addition, wellbore tubulars 116 extend along the length of wellbore 112 and connect with an adjacent casing or other wellbore tubular, such as a liner section. While the environment illustrated with respect to FIG. 1 illustrates wellbore tubular 116 in the form of a casing or liner section, any other suitable wellbore tubular such as a casing string, a work string, a drilling string, a coiled tubing string, a jointed tubing string, or combinations thereof, may additionally be disposed within the wellbore 112. Cement 118 is filled in annulus 120 to set wellbore tubulars 116 in wellbore 112.

Perforations 122 are made through wellbore tubulars 116 and into the formation to allow the formation fluid to flow into wellbore 112.

Production tubing 110 is placed in wellbore 112 and is configured to act as a conduit for the flow of hydrocarbons to well site 102. Production tubing 110 may include one or more screen assemblies 124 disposed in annulus 126 of wellbore 112. Screen assembly 124 is positioned in annulus 126 proximate to perforations 122. Screen assembly 124 is constructed of metal or any other suitable material. Once screen assembly 124 has been installed as illustrated, treatment fluid 140 containing sand, gravel, proppants or the like is pumped down wash pipe 132. As such, wash pipe 132 fills and packs screen assembly 124 with the material from treatment fluid 140 to substantially prevent the flow of formation solids into production tubing 110. Treatment fluid 140 deposited proximate to screen assembly 124 creates a gravel pack. A packed screen assembly 124 may further be configured to reduce the velocity of formation fluids into production tubing 110. During deposition of treatment fluid 140 to create the gravel pack, voids may be generated that can be detected by logging tool 134. Screen assembly 124 includes a first end disposed uphole, for example, toward well site 102, and a second end disposed downhole, for example, toward the bottom or end of wellbore 112. Further, even though FIG. 1 depicts one screen assembly 124, the logging processes of the present disclosure may be utilized with any number of screen assemblies.

In a pack operation, such as a gravel pack operation, wash pipe 132 is lowered into wellbore 112. Wash pipe 132 may be any type of flexible piping configured to traverse wellbore 112. Wash pipe 132 includes logging tool 134. Use of wash pipe 132 may be particularly appropriate for lowering logging tool 134 into a well with a generally horizontal section. Logging tool 134 may be located partially or completely inside wash pipe 132. Logging tool 134 may be installed directly in wash pipe 132 or may be installed in a housing, gage carrier, or bundle carrier, and the housing, gage carrier, or bundle carrier may be installed in or coupled to wash pipe 132. Logging tool 134 may be integrated into or otherwise coupled to the interior or exterior of wash pipe 132 via any suitable coupling mechanism. In operation, logging tool 134 is lowered to be located downhole of screen assembly 124. Logging tool 134 measures and logs various characteristics of the formation as logging tool 134 is lowered to generate background or baseline measurements.

Wash pipe 132 includes valves 136 that allow treatment fluid 140 pumped under pressure from the surface to flow proximate to screen assembly 124 into annulus 126 and back to the surface via annulus 126 or other passage. Sand, gravel, and proppants contained in treatment fluid 140 are deposited, creating a gravel pack, proximate screen assembly 124. After or during gravel pack operations, logging tool 134 may be raised or lowered to traverse screen assembly 124 one or multiple times and perform measurements and logging.

Logging facility 138 collects measurements from logging tool 134, and includes computing facilities for controlling logging tool 134, processing the measurements gathered by logging tool 134, or storing measurements gathered by logging tool 134. The measurements include the background or baseline measurements and the comparative measurements. While logging facility 138 is shown in FIG. 1 as being onsite, logging facility 138 may be located remote from well site 102 and wellbore 112.

Logging tool 134 includes a activator module, which is discussed in more detail with reference to FIGS. 2 and 3. The activator module may include a mechanical interference device, such as a mechanical switch, and a switching system. As logging tool 134 is lowered, the mechanical interference device cooperates or interacts with one or more mechanical intrusions associated with screen assembly 124. The mechanical intrusions may be located on one or both ends of screen assembly 124. When logging tool 134 traverses a mechanical intrusion, the mechanical interference device is actuated and in turn, communicates with the switching system, for example, via a mechanical coupling or an electrical signal, collectively referred to as a trigger indication.

The activator module may include a magnetic sensor. In this case, as logging tool 134 is lowered, the magnetic sensor cooperates or interacts with one or more magnetic devices associated with screen assembly 124. The magnetic devices may be located on one or both ends of screen assembly 124. When logging tool 134 traverses a magnetic device, the magnetic sensor senses the magnetic field and in turn, communicates with the switching system.

The trigger indication is sensed by the activator module and the switching system switches the logging tool from an inactive state to an active state and/or from an active state to an inactive state. For example, the trigger indication induces an electrical response within the activator module. On receiving the trigger indication, the logging tool switches from a configuration in which no electrical component associated with the logging tool receives power from a power supply associated with the logging tool to a configuration in which one or more electrical components receives power from the power supply. Although discussed with reference to particular configurations, the trigger indication may be mechanical coupling, a magnetic signal, an electromagnetic (EM) signal, an radio frequency signal, an electrical signal, a wireless signal, an energy signal, an acoustic signal, an optical signal, or any other suitable signal type.

The switching system is configured to switch logging tool 134 from an inactive state to an active state or from an active state to an inactive state. In the inactive state, a circuit associated with the logging tool between a power supply and any electrical load in the logging tool is incomplete and any route of electrical power flow between a power supply associated with the logging tool and an electrical load associated with the logging tool is disallowed (for example, no electrical or electronic component associated with the logging tool receives power from the power supply). Also, in an active state, the circuit is complete and the route of electrical current flow between the power supply and the electrical load is allowed (for example, one or more electrical components receives electrical power from the power supply). Thus, in the active state, an electrical load associated with the logging tool is energized by a power supply. The mechanical interference device interacting with a mechanical intrusion causes the switching system to switch logging tool 134 to an inactive state if the logging tool was previously in an active state. Likewise, if logging tool 134 was in an active state, the mechanical interference device interacting with the mechanical intrusion causes the switching system to switch logging tool 134 to an inactive state.

Figure 2:
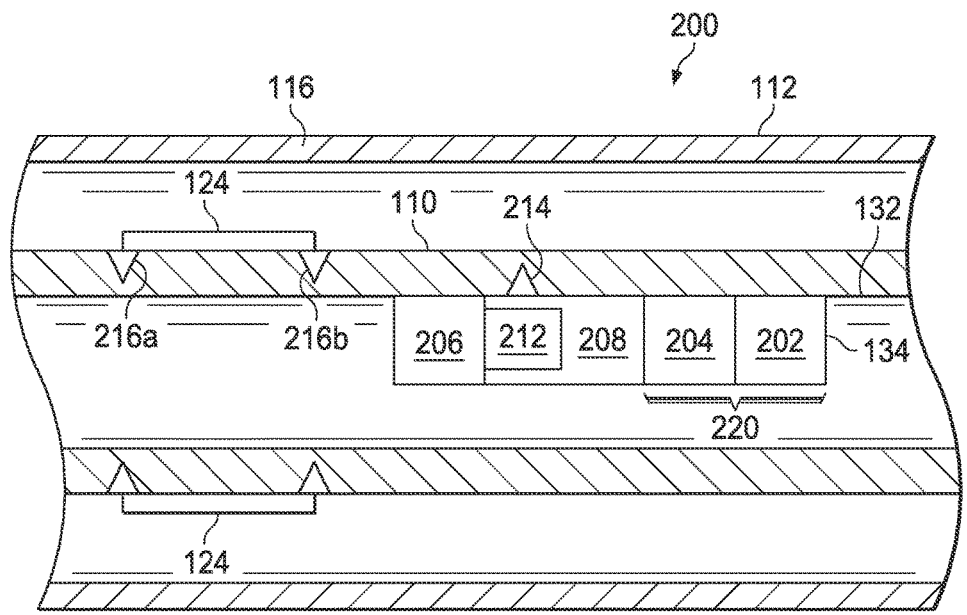
FIG. 2 is an elevation view of an exemplary logging tool system using mechanical interaction.

FIG. 2 is an elevation view of an exemplary logging tool system 200 using mechanical interaction. Logging tool system 200 includes logging tool 134 configured in wellbore 112. Logging tool 134 is any suitable tool utilized for measurement and logging of downhole properties. For example, logging tool 134 may be a pulsed neutron tool. For logging related to a gravel pack, a pulsed neutron tool utilizes pulses from a neutron generator that are separated by time, which yields additional information for analysis. Logging tool 134 includes neutron module 202, memory module 204, power supply 206, and activator module 208. Neutron module 202 and memory module 204 may be collectively referred to as electrical load 220.

Neutron module 202 includes any suitable source for generating nuclear energy and/or radiation. Neutron module 202 further includes any suitable sensor or detector configured to receive gamma rays emitted from objects that are penetrated by particles emitted by neutron module 202. For example, a detector of neutron module 202 may include a sodium iodide crystal and a photo-multiplier tube to convert light signals to electric signals. The electric signals may be processed to determine count rates, energy levels, saturation, and/or lithography. The data is stored in memory module 204 for downloading after logging tool 134 is retrieved to the surface. As such, neutron module 202 may be configured to quantify the count rate of particles, lithography or saturation of the gravel pack, and store, and/or transmit data. Accordingly, neutron module 202 includes a processing system that may include, for example, a general purpose processor, a mathematical processor, a state machine, a digital signal processor, a video processor, an audio processor, a logic unit, a logic element, a multiplexer, a demultiplexer, a switching unit, a switching element an input/output (I/O) element, a peripheral controller, a bus, a bus controller, a register, a combinatorial logic element, a storage unit, a programmable logic device, a memory unit, a neural network, a sensing circuit, a control circuit, a digital to analog converter (DAC), an analog to digital converter (ADC), an oscillator, a memory, a filter, an amplifier, a mixer, a modulator, a demodulator, and/or any other suitable devices.

Memory module 204 is communicatively coupled to neutron module 202 and comprises any system, device, or apparatus configured to retain program instructions or data for a period of time (for example, computer-readable media). Memory module 204 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to logging tool 134 is removed.

Power supply 206 is communicatively coupled to neutron module 202, memory module 204, and activator module 208. Power supply 206 includes any suitable power source and is configured to supply any suitable voltage, current, and/or power required to power and/operate any electrical load 220 associated with logging tool 134. Power supply 206 supplies power to electrical load 220 when enabled by switching system 212. Power supply 206 comprises an on-board battery, a renewable power source, a voltage source, a current source, or any other suitable power source. For example, power supply 206 may be a galvanic cell or a lithium battery.

Logging tool 134 includes activator module 208. Activator module 208 is communicatively coupled, via switching system 212, to power supply 206. Activator module 208 is be configured to switch logging tool 134 from an activate state to an inactive state or switch logging tool 134 from an inactive state to an active state. Activator module 208 includes switching system 212. Switching system 212 may include one or more switches to switch logging tool 134 between the inactive state and the active state. In the inactive state, switching system 212 causes a circuit associated with logging tool 134 between power supply 206 and electrical load 220 in logging tool 134 to be incomplete and any route of electrical power flow between power supply 206 and electrical load 220 is disallowed (for example, no electrical or electronic component associated with logging tool 134 receives power from power supply 206). Also, in an active state, switching system 212 causes the circuit to be complete and the route of electrical current flow between power supply 206 and electrical load 220 is allowed (for example, one or more electrical components receives electrical power from power supply 206). Including activator module 208 within logging tool 134 assists in overcoming power limitations for logging tool 134.

Activator module 208 includes mechanical interference device 214. For example, mechanical interference device 214 may be a mechanical switch. Mechanical interference device 214 is configured to cooperate or interact with one or more mechanical intrusions 216a or 216b (collectively "mechanical intrusions 216") associated with screen assembly 124 to communicate a trigger indication to switching system 212. Mechanical intrusions 216 are any type of extension that extends at least partially into production tubing 110. For example, mechanical intrusion 216 may be a collet or series of collets. Further, the present disclosure may be configured with one mechanical intrusion located at one end of screen assembly 124 or may be configured with two or more mechanical intrusions located at two ends of screen assembly 124, uphole from screen assembly 124, and/or downhole from screen assembly 124.

When mechanical interference device 214 traverses a mechanical intrusion, such as mechanical intrusion 216a, mechanical interference device 214 is actuated and, in turn, communicates a trigger indication to switching system 212, for example, via a mechanical coupling or an electrical signal. Likewise, when mechanical interference device 214 traverses mechanical intrusion 216b, an additional trigger indication is communicated to switching system 212. Thus, mechanical interference device 214 interacting with mechanical intrusion 216 causes switching system 212 to switch logging tool 134 to an inactive state if logging tool 134 was previously in an active state. Likewise, if logging tool 134 was in an active state, mechanical interference device 214 interacting with mechanical intrusion 216 causes switching system 212 to transition logging tool 134 to an inactive state. In the inactive state, logging tool 134 consumes substantially no or negligible power from power supply 206, for example, when downhole from screen assembly 124.

Activator module 208 is configured to passively receive and/or passively sense a trigger indication. As such, activator module 208 may be a passive device and is not electrically coupled to power supply 206 or other power source. For example, activator module 208 may not require electrical power to operate and/or to generate an electrical response. Additionally, activator module 208 may be configured to convert an energy signal, for example, a mechanical movement or magnetic signal, to a suitable trigger indication, for example, an mechanical or electrical signal sufficient to activate switching system 212.

In operation, neutron module 202 emits neutrons, which travel from neutron module 202 to screen assembly 124 and into annulus 126. Neutron module 202 receives, senses, or detects the gamma rays emitted from annulus 126 and generates a corresponding count rate, or provides data related to saturation or lithography. The count rate is proportional to the amount of scattering the neutrons are subjected to in annulus 126. The amount of scattering may be a result of the concentration or density of the gravel or proppant that filled annulus 126. As such, logging tool 134 determines whether the annular gravel pack is of sufficient concentration to substantially prevent sand flow and whether the quality of the annular gravel pack should be improved. Additional examples of logging tool 134 are provided in further detail below.

Figure 3:
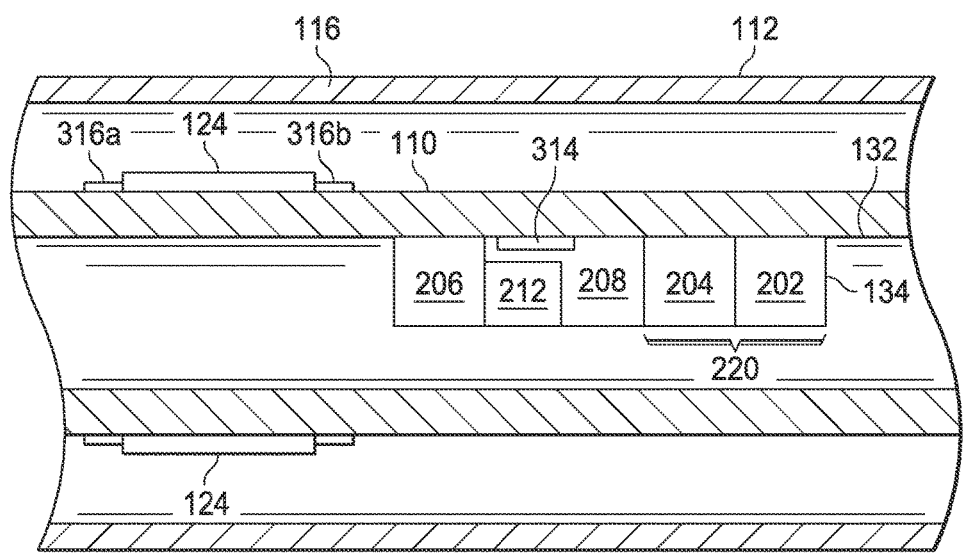
FIG. 3 is an elevation view of an exemplary logging tool system using magnetic coupling.

FIG. 3 is an elevation view of an exemplary logging tool system 300 using magnetic coupling. In the configuration of FIG. 3, activator module 208 includes magnetic sensor 314 to detect a magnetic field from one or more magnetic devices 316 associated with screen assembly 124. When logging tool 134 traverses magnetic device 316, magnetic sensor 314 detects a magnetic field and communicates with the switching system, for example, via a trigger indication. Thus, magnetic sensor 314 interacting with magnetic device 316 causes switching system 212 to switch logging tool 134 from an inactive state if logging tool 134 was previously in an active state. Likewise, if logging tool 134 was in an active state, magnetic sensor 314 interacting with magnetic device 316 causes switching system 212 to switch logging tool 134 to an inactive state.

Logging tool system 300 includes logging tool 134 configured in wellbore 112, as discussed with reference to FIG. 1. Logging tool 134 is any suitable tool utilized for measurement and logging of downhole properties. For example, logging tool 134 may be a pulsed neutron tool. As such, logging tool 134 includes neutron module 202, memory module 204, and power supply 206 as discussed with reference to FIG. 2. Activator module 208 may include switching system 212 as also discussed with reference to FIG. 2.

Activator module 208 may include magnetic sensor 314. Magnetic sensor 314 is configured to cooperate or interact with one or more magnetic devices 316a or 316b (collectively "magnetic devices 316) associated with screen assembly 124 to communicate a trigger indication to switching system 212. Magnetic sensor 314 may be a magnetic pickup. Magnetic sensor 314 and magnetic devices 316 are any type of magnet or electro-magnet and are composed of a material that may have a high magnetic permeability, such as a permanent magnet. For example, magnetic sensor 314 and magnetic devices 316 may be composed of magnetic transition metals and transition metal alloys, particularly annealed (soft) iron or a permalloy (sometimes referred to as a "MuMetal"), which are a family of Ni—Fe—Mo alloys, ferrite, or any other alloy or combination of alloys that exhibits ferromagnetic properties. Magnetic sensor 314 and magnetic devices 316 may include a core and a winding that may be wrapped directly onto the core or may be wrapped on a bobbin. Magnetic sensor 314 and magnetic devices 316 may be inductively coupled. Further, the present disclosure may be configured with one magnetic device located proximate to one end of screen assembly 124 or may be configured with two or more magnetic devices located proximate to two ends of screen assembly 124, uphole from screen assembly 124, and/or downhole from screen assembly 124.

When magnetic sensor 314 traverses a magnetic device, such as magnetic device 316a, magnetic sensor 314 senses a magnetic field and, in turn, communicates a trigger indication to switching system 212, for example, via a magnetic signal or an electrical signal. Likewise, when magnetic sensor 314 traverses magnetic device 316b, another trigger indication is communicated to switching system 212. Thus, magnetic sensor 314 interacting with magnetic devices 316 causes switching system 212 to switch logging tool 134 to an inactive state if logging tool 134 was previously in an active state. Similarly, if logging tool 134 was in an active state, magnetic sensor 314 interacting with magnetic devices 316 causes switching system 212 to switch logging tool 134 to an inactive state.

Logging tool 134 may include a positive indication that logging tool 134 is in the active state. For example, logging tool 134 may include a tension indicator to indicate that logging tool 134 is in the active state and/or is operating. For example, a tension indicator may detect increased tension when logging tool 134 is operational and logging data. Logging tool 134 may be configured to transmit data samples to well site 102 in approximately real time during the active state (for example, while logging data). Transmission may be accomplished via wash pipe 132 or an associated work string that may include repeaters. The data transmitted may be used for further analysis, and may allow confirmation that logging tool 134 is operating and collecting data.

Moreover, activator module 208 may be pre-programmed to communicate a trigger indication to switching system based on any combination of traversal of mechanical intrusions 216 (discussed in FIG. 2) or magnetic devices 316 (discussed in FIG. 3). For example, activator module 208 may be pre-programmed to require traversal of two mechanical intrusions 216 or magnetic devices 316 before communicating the trigger indication.

Although discussed with reference to mechanical interaction in FIG. 2 and magnetic coupling in FIG. 3, the present disclosure contemplates activator module 208 using other suitable activation mechanisms that consume minimal or no electrical power, such as an RFID system.

Logging tool systems 200 and 300 are used during gravel pack logging operations. For example, a logging tool system includes screen assembly 124 that may be configured with mechanical intrusion 216b (shown in FIG. 2) or magnetic device 316b (shown in FIG. 3). Logging tool 134 is lowered from well site 102 in an inactive state, for example, switching system 212 is configured such that a circuit between power supply 206 and any electrical load associated with neutron module 202 and memory module 204 may be incomplete. Maintaining logging tool 134 in an inactive state at well site 102 minimizes or eliminates exposure of personnel or equipment at well site 102 to radiation generated by neutron module 202. At some point in wellbore 112, switching system 212 may switch logging tool 134 to an active state by completing a circuit between power supply 206 and electrical load 220. For example, a timer, pressure sensor, temperature sensor, motions sensor (for example, accelerometer), or combination of mechanisms may be configured to activate switching system 212 at a certain depth in wellbore 112. Logging tool 134 in an active state emits neutrons that are received by gravel and proppant contained in annulus 126.

As logging tool 134 is lowered proximate screen assembly 124, neutron module 202 detects and receives gamma rays emitted from annulus 126. Neutron module 202 communicates the received data to memory module 204 for storage. With reference to FIG. 2, when logging tool 134 is lowered past screen assembly 124, mechanical intrusion 216b and mechanical interference device 214 may interact or cooperate to cause switching system 212 to transition logging tool 134 to an inactive state. Alternatively, with reference to FIG. 3, magnetic sensor 314 may detect a magnetic field associated with magnetic device 316b. The received magnetic field causes magnetic sensor 314 to communicate a trigger indication and causes switching system 212 to switch logging tool 134 to an inactive state. In either configuration, logging tool 134 may remain in an inactive state while downhole from screen assembly 124 thereby conserving energy from power supply 206.

Once the gravel packing operation is complete, logging tool 134 may be raised from wellbore 112 at a selected speed that allows logging tool 134 to perform necessary measurements across the length of the gravel packed section. With reference to FIG. 2, when logging tool 134 is raised toward screen assembly 124, mechanical intrusion 216b and mechanical interference device 214 interact or cooperate to cause switching system 212 to switch logging tool 134 to an active state. Alternatively, with reference to FIG. 3, magnetic sensor 314 detects a magnetic field associated with magnetic device 316b. The received magnetic field causes magnetic sensor 314 to communicate a trigger indication and causes switching system 212 to switch logging tool 134 to an active state.

Logging tool 134 in an active state emits neutrons that are received by gravel and proppant contained in annulus 126. As logging tool 134 is raised proximate screen assembly 124, neutron module 202 detects and receives gamma rays emitted from annulus 126. Neutron module 202 may communicate the received data to memory module 204 for storage.

As another example, a logging tool system includes screen assembly 124 that may be configured with mechanical intrusions 216a and 216b (shown in FIG. 2) or magnetic devices 316a and 316b (shown in FIG. 3). Logging tool 134 is lowered from well site 102 in an inactive state, for example, switching system 212 is configured such that a circuit between power supply 206 and any electrical load associated with neutron module 202 and memory module 204 may be incomplete. Maintaining logging tool 134 in an inactive state at well site 102 may minimize or eliminate exposure of personnel or equipment at well site 102 to radiation generated by neutron module 202. With reference to FIG. 2, when logging tool 134 is lowered toward screen assembly 124, mechanical intrusion 216a and mechanical interference device 214 interact or cooperate to cause switching system 212 to switch logging tool 134 to an active state. Alternatively, with reference to FIG. 3, magnetic sensor 314 detects a magnetic field associated with magnetic device 316a. The received magnetic field causes magnetic sensor 314 to communicate a trigger indication and causes switching system 212 to switch logging tool 134 to an active state. Logging tool 134 in an active state emits neutrons that are received by gravel and proppant contained in annulus 126.

As logging tool 134 is lowered proximate screen assembly 124, neutron module 202 detects and receives gamma rays emitted from annulus 126. Neutron module 202 communicates the received data to memory module 204 for storage. With reference to FIG. 2, when logging tool 134 is lowered past screen assembly 124, mechanical intrusion 216b and mechanical interference device 214 interact or cooperate to cause switching system 212 to transition logging tool 134 to an inactive state. Alternatively, with reference to FIG. 3, magnetic sensor 314 detects a magnetic field associated with magnetic device 316b. The received magnetic field causes magnetic sensor 314 to communicate a trigger indication and causes switching system 212 to transition logging tool 134 to an inactive state. In either configuration, logging tool 134 may remain in an inactive state while downhole from screen assembly 124 thereby conserving energy from power supply 206.

Once the gravel packing operation is complete, logging tool 134 may be raised from wellbore 112 at a selected speed that allows logging tool 134 to perform necessary measurements across the length of the gravel packed section. With reference to FIG. 2, when logging tool 134 is raised toward screen assembly 124, mechanical intrusion 216b and mechanical interference device 214 interact or cooperate to cause switching system 212 to transition logging tool 134 to an active state. Alternatively, with reference to FIG. 3, magnetic sensor 314 detects a magnetic field associated with magnetic device 316b. The received magnetic field causes magnetic sensor 314 to communicate a trigger indication and causes switching system 212 to switch logging tool 134 to an active state.

Logging tool 134 in an active state emits neutrons that are received by gravel and proppant contained in annulus 126. As logging tool 134 is raised proximate screen assembly 124, neutron module 202 detects and receives gamma rays emitted from annulus 126. Neutron module 202 communicates the received data to memory module 204 for storage. Upon retrieval of logging tool 134 from wellbore 112, data stored in memory module 204 may be downloaded for processing. For example, a well site plot of count versus depth may be generated that may indicate the condition of the gravel pack and the integrity of the gravel packed section.

As can be seen from the operational examples, many different sequences of the active state and inactive state may be programmed or configured. Further, additional states may be contemplated in the present disclosure, such as a sleep state or partially active state, as required for a particular implementation. Accordingly, the present disclosure may be utilized to conserve power in a power source associated with a logging tool. Further, the present disclosure may allow multiple passes of a logging tool proximate to a gravel pack section without depleting a power source. Moreover, although described with reference to a gravel pack, the present disclosure may be utilized to determine properties of any downhole formation, such as cement, frac packs, and water packs, or to perform an inspection, such as a casing inspection or cement inspection.

Embodiments disclosed herein include:

A. A method for logging includes lowering a logging tool in a wellbore tubular, and actuating a mechanical interference device based on interaction with a first mechanical intrusion associated with a screen assembly located downhole in a wellbore. The mechanical interference device is included in an activator module associated with the logging tool. Based on actuating the mechanical interference device, the method includes communicating a first trigger indication to a switching system included with the activator module. In response to the first trigger indication, the method further includes switching the logging tool between an inactive state and an active state. In the active state, an electrical load associated with the logging tool is energized by a power supply.

B. A logging tool system includes a logging tool configured for deployment in a wellbore tubular. The system also includes an activator module associated with the logging tool, and a switching system included with the activator module and configured to switch the logging tool between an inactive state and an active state in response to a first trigger indication. In the active state, an electrical load associated with the logging tool is energized by a power supply, The system further includes a mechanical interference device included with the activator module and configured to actuate based on interaction with a first mechanical intrusion associated with a screen assembly located downhole in a wellbore, and communicate the first trigger indication to the switching system.

Each of embodiments A and B may have one or more of the following additional elements in any combination: Element 1: further comprising, actuating the mechanical interference device based on interaction with a second mechanical intrusion associated with the screen assembly, the second mechanical intrusion located downhole from the first mechanical intrusion, and based on actuating the mechanical interference device, communicating a second trigger indication to the switching system, and switching the logging tool between the active state and the inactive state in response to the second trigger indication. Element 2: wherein the first mechanical intrusion device is located at a first end of the screen assembly and the second mechanical intrusion device is located on a second end of the screen assembly. Element 3: wherein the first trigger indication causes the logging tool to switch from the inactive state to the active state. Element 4: wherein the first trigger indication causes the logging tool to switch from the active state to the inactive state. Element 5: wherein the electrical load comprises a pulsed neutron tool and a memory. Element 6: further comprising the switching system configured to switch the logging tool between the active state and the inactive state in response to a second trigger indication.

Embodiments disclose herein also include:

C. A method for logging including lowering a logging tool in a wellbore tubular, and detecting, by a magnetic sensor, a first magnetic field from a first magnetic device associated with a screen assembly located downhole in a wellbore. The magnetic sensor is included in an activator module associated with the logging tool. Based on detecting the first magnetic field, the method also includes communicating a first trigger indication to a switching system included with the activator module. In response to the first trigger indication, the method further includes switching the logging tool between an inactive state and an active state. In the active state, an electrical load associated with the logging tool is energized by a power supply.

D. A logging tool system includes a logging tool configured for deployment in a wellbore tubular. The system also includes an activator module associated with the logging tool, and a switching system included with the activator module and configured to switch the logging tool between an inactive state and an active state in response to a first trigger indication. In the active state, an electrical load associated with the logging tool is energized by a power supply. The system further includes a magnetic sensor included with the activator module and configured to detect a first magnetic field from a first magnetic device associated with a screen assembly located downhole in a wellbore, and communicate the first trigger indication to the switching system.

Each of embodiments C and D may have one or more of the following additional elements in any combination: Element 1: further comprising detecting, by the magnetic sensor, a second magnetic field from a second magnetic device associated with the screen assembly, the second magnetic device located downhole from the first mechanical intrusion, and based on detecting the second magnetic field, communicating a second trigger indication to the switching system, and switching the logging tool between the active state and the inactive state in response to the second trigger indication. Element 2: wherein the first magnetic device is located at a first end of the screen assembly and the second magnetic device is located on a second end of the screen assembly. Element 3: wherein the first trigger indication causes the logging tool to switch from the inactive state to the active state. Element 4: wherein the first trigger indication causes the logging tool to switch from the active state to the inactive state. Element 5: wherein the electrical load comprises a pulsed neutron tool and a memory. Element 6: further comprising the switching system configured to switch the logging tool between the active state and the inactive state in response to a second trigger indication.

Although the present disclosure has been described with several configurations and example operations, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. A method for logging comprising:
   lowering a logging tool in a wellbore tubular;
   actuating a mechanical interference device based on interaction with a first mechanical intrusion associated with a screen assembly located downhole in a wellbore, the mechanical interference device included in an activator module associated with the logging tool;
   based on actuating the mechanical interference device, communicating a first trigger indication to a switching system included with the activator module; and
   in response to the first trigger indication, switching the logging tool between an inactive state and an active state, wherein in the active state, an electrical load associated with the logging tool is energized by a power supply.

2. The method of claim 1, further comprising:
   actuating the mechanical interference device based on interaction with a second mechanical intrusion associated with the screen assembly, the second mechanical intrusion located downhole from the first mechanical intrusion;
   based on actuating the mechanical interference device, communicating a second trigger indication to the switching system; and
   switching the logging tool between the active state and the inactive state in response to the second trigger indication.

3. The method of claim 2, wherein the first mechanical intrusion device is located at a first end of the screen assembly and the second mechanical intrusion device is located at a second end of the screen assembly.

4. The method of claim 1, wherein the first trigger indication causes the logging tool to switch from the inactive state to the active state.

5. The method of claim 1, wherein the first trigger indication causes the logging tool to switch from the active state to the inactive state.

6. A logging tool system comprising:
   a logging tool configured for deployment in a wellbore tubular;
   an activator module associated with the logging tool;
   a switching system included with the activator module and configured to switch the logging tool between an inactive state and an active state in response to a first trigger indication, wherein in the active state, an electrical load associated with the logging tool is energized by a power supply; and
   a mechanical interference device included with the activator module and configured to:
      actuate based on interaction with a first mechanical intrusion associated with a screen assembly located downhole in a wellbore; and
      communicate the first trigger indication to the switching system.

7. The system of claim 6, wherein the first trigger indication causes the logging tool to switch from the inactive state to the active state.

8. The system of claim 6, wherein the first trigger indication causes the logging tool to switch from the active state to the inactive state.

9. The system of claim 6, wherein the electrical load comprises a pulsed neutron tool and a memory.

10. The system of claim 6, further comprising the switching system configured to switch the logging tool between the active state and the inactive state in response to a second trigger indication.

11. A method for logging comprising:
lowering a logging tool in a wellbore tubular;
detecting, by a magnetic sensor, a first magnetic field from a first magnetic device associated with a screen assembly located downhole in a wellbore, the magnetic sensor included in an activator module associated with the logging tool;
based on detecting the first magnetic field, communicating a first trigger indication to a switching system included with the activator module; and
in response to the first trigger indication, switching the logging tool between an inactive state and an active state, wherein in the active state, an electrical load associated with the logging tool is energized by a power supply.

12. The method of claim 11, further comprising:
detecting, by the magnetic sensor, a second magnetic field from a second magnetic device associated with the screen assembly, the second magnetic device located downhole from the first mechanical intrusion;
based on detecting the second magnetic field, communicating a second trigger indication to the switching system; and
switching the logging tool between the active state and the inactive state in response to the second trigger indication.

13. The method of claim 12, wherein the first magnetic device is located at a first end of the screen assembly and the second magnetic device is located at a second end of the screen assembly.

14. The method of claim 11, wherein the first trigger indication causes the logging tool to switch from the inactive state to the active state.

15. The method of claim 11, wherein the first trigger indication causes the logging tool to switch from the active state to the inactive state.

16. A logging tool system comprising:
a logging tool configured for deployment in a wellbore tubular;
an activator module associated with the logging tool;
a switching system included with the activator module and configured to switch the logging tool between an inactive state and an active state in response to a first trigger indication, wherein in the active state, an electrical load associated with the logging tool is energized by a power supply; and
a magnetic sensor included with the activator module and configured to:
detect a first magnetic field from a first magnetic device associated with a screen assembly located downhole in a wellbore; and
communicate the first trigger indication to the switching system.

17. The system of claim 16, wherein the first trigger indication causes the logging tool to switch from the inactive state to the active state.

18. The system of claim 16, wherein the first trigger indication causes the logging tool to switch from the active state to the inactive state.

19. The system of claim 16, wherein the electrical load comprises a pulsed neutron tool and a memory.

20. The system of claim 16, further comprising the switching system configured to switch the logging tool between the active state and the inactive state in response to a second trigger indication.

* * * * *